US011632457B1

(12) United States Patent
Judge et al.

(10) Patent No.: US 11,632,457 B1
(45) Date of Patent: Apr. 18, 2023

(54) DYNAMIC DIRECTION OF INCOMING CALLS

(71) Applicant: 8x8, Inc., Campbell, CA (US)

(72) Inventors: Garth Judge, Campbell, CA (US); Zhishen Liu, Campbell, CA (US); Bryan R. Martin, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

(21) Appl. No.: 17/352,836

(22) Filed: Jun. 21, 2021

Related U.S. Application Data

(63) Continuation of application No. 15/240,290, filed on Aug. 18, 2016, now Pat. No. 11,044,360.

(Continued)

(51) Int. Cl.
*H04M 3/00* (2006.01)
*H04M 5/00* (2006.01)
(Continued)

(52) U.S. Cl.
CPC ............. *H04M 3/02* (2013.01); *H04M 1/247* (2013.01); *H04M 3/42348* (2013.01);
(Continued)

(58) Field of Classification Search
CPC ......... H04M 1/72519; H04M 1/72522; H04M 19/04; H04M 19/047; H04M 19/048; H04M 1/0245; H04M 1/72552; H04M 2250/22; H04M 3/02; H04M 3/436; H04M 1/72583; H04M 1/006; H04M 1/57; H04M 1/575; H04M 1/72597; H04M 2201/42; H04M 7/0033; H04M 1/56; H04M 1/72561; H04M 1/72563; H04M 1/72569; H04M 1/72572; H04M 2203/2011; H04M 3/42042; H04M 3/42051; H04M 3/42102; G06F 3/0482;
(Continued)

(56) References Cited

U.S. PATENT DOCUMENTS

| 4,754,479 A | 6/1988 | Bicknell et al. |
| 5,073,890 A | 12/1991 | Danielsen |

(Continued)

FOREIGN PATENT DOCUMENTS

| JP | 2001-237965 A | 8/2001 |
| WO | 01/50682 A1 | 7/2001 |

OTHER PUBLICATIONS

MicroTelco Gateway Phone Center, Quicknet Technologies, Inc., www.quicknet.net/products/mtg_phonecenter (May 28, 2003), 2 pgs.

(Continued)

*Primary Examiner* — Kharye Pope
(74) *Attorney, Agent, or Firm* — Crawford Maunu PLLC

(57) ABSTRACT

Apparatus and methods concerning call routing are disclosed. In an example embodiment, a call alert message, indicative of the call answer options, is communicated from a data-communications server to the communication device, determined in response to receiving an incoming call for a communication device at the server. A selected option is received from the communication device. In response to the selected option indicating the first call answer option, the call is routed to the communication device as a call via a data network or in response to the selected option indicating the second call answer option, the call is routed to the communication device via a PSTN.

21 Claims, 5 Drawing Sheets

Related U.S. Application Data

(60) Provisional application No. 62/268,801, filed on Dec. 17, 2015.

(51) Int. Cl.
| | |
|---|---|
| *H04L 12/66* | (2006.01) |
| *H04M 3/02* | (2006.01) |
| *H04M 7/12* | (2006.01) |
| *H04M 3/54* | (2006.01) |
| *H04M 3/42* | (2006.01) |
| *H04M 1/247* | (2021.01) |

(52) U.S. Cl.
CPC ......... *H04M 3/543* (2013.01); *H04M 7/1285* (2013.01); *H04M 2242/08* (2013.01)

(58) Field of Classification Search
CPC .......... G06F 3/016; G06F 2203/04105; G06F 3/0233; G06F 3/04817; G06F 3/0488; G06F 3/04842; H04W 88/06; H04W 52/027; H04W 76/15; H04W 36/24; H04W 36/28; H04W 4/16; H04W 76/10; H04W 84/042; H04W 84/12; H04W 24/02; H04L 65/106; H04L 65/1096; H04L 29/06027; H04L 61/157; H04L 65/1006; H04L 65/80; H04L 65/1016; H04L 12/66; H04L 29/12896; H04L 61/605; H04L 65/1053; H04L 65/1076; H04L 47/24; H04L 61/1547
USPC ..... 370/352, 353, 356; 455/445, 412.2, 417, 455/414.1, 415; 379/142.07, 211.02, 379/265.09
See application file for complete search history.

(56) References Cited

U.S. PATENT DOCUMENTS

| | | | |
|---|---|---|---|
| 5,311,570 A | 5/1994 | Grimes et al. | |
| 5,317,621 A | 5/1994 | Shibayama | |
| 5,598,464 A | 1/1997 | Hess et al. | |
| 5,644,404 A | 7/1997 | Hashimoto et al. | |
| 5,689,555 A | 11/1997 | Sonnenberg | |
| 5,703,941 A | 12/1997 | Nakajima et al. | |
| 5,832,061 A | 11/1998 | Rubin | |
| 5,933,785 A | 8/1999 | Tayloe | |
| 5,946,618 A | 8/1999 | Agre et al. | |
| 5,978,450 A | 11/1999 | McAllister et al. | |
| 6,011,844 A | 1/2000 | Uppaluru et al. | |
| 6,173,041 B1 | 1/2001 | Borland et al. | |
| 6,185,288 B1 | 2/2001 | Wong | |
| 6,215,783 B1 | 4/2001 | Neyman | |
| 6,236,851 B1 | 5/2001 | Fougnies et al. | |
| 6,324,402 B1 | 11/2001 | Waugh et al. | |
| 6,567,514 B2 | 5/2003 | Fleischer, III et al. | |
| 6,574,216 B1 | 6/2003 | Farris et al. | |
| 6,574,335 B1 | 6/2003 | Kalmanek, Jr. et al. | |
| 6,628,760 B2 | 9/2003 | Mirashrafi et al. | |
| 6,671,523 B1 | 12/2003 | Niepel et al. | |
| 6,683,870 B1 | 1/2004 | Archer | |
| 6,707,811 B2 | 3/2004 | Greenberg et al. | |
| 6,711,241 B1 | 3/2004 | White et al. | |
| 6,731,630 B1 | 5/2004 | Schuster et al. | |
| 6,747,970 B1 | 6/2004 | Lamb et al. | |
| 6,760,324 B1 | 7/2004 | Scott et al. | |
| 6,775,267 B1 | 8/2004 | Kung et al. | |
| 6,850,758 B1 | 2/2005 | Paul et al. | |
| 6,870,835 B1 | 3/2005 | Chen et al. | |
| 6,985,478 B2 | 1/2006 | Pogossiants et al. | |
| 6,996,603 B1 | 2/2006 | Srinivasan | |
| 7,072,354 B1 | 7/2006 | Beathard | |
| 7,082,300 B1 | 7/2006 | Link, II | |
| 7,245,912 B1 | 7/2007 | Fenton | |
| 7,349,700 B1 | 3/2008 | Goldfinger | |
| 7,383,535 B1 | 6/2008 | Kshetrapal et al. | |
| 7,551,913 B1 | 6/2009 | Chien | |
| 7,555,110 B2 | 6/2009 | Dolan et al. | |
| 7,684,554 B1 | 3/2010 | Vincent et al. | |
| 7,822,188 B1* | 10/2010 | Kirchhoff ........... | H04L 65/1096 379/211.02 |
| 8,504,018 B2 | 8/2013 | I'anson | |
| 8,620,265 B1* | 12/2013 | Gailloux ................ | H04M 15/85 379/114.03 |
| 2002/0049745 A1 | 4/2002 | Yuichiro et al. | |
| 2002/0112021 A1 | 8/2002 | Detlef | |
| 2002/0128857 A1 | 9/2002 | Lee | |
| 2002/0146104 A1 | 10/2002 | McIntyre | |
| 2002/0174141 A1 | 11/2002 | Chen | |
| 2002/0197991 A1 | 12/2002 | Anvekar et al. | |
| 2003/0009593 A1 | 1/2003 | Apte | |
| 2003/0059039 A1 | 3/2003 | Meyerson et al. | |
| 2005/0091327 A1 | 4/2005 | Koch | |
| 2006/0077956 A1 | 4/2006 | Saksena et al. | |
| 2006/0142012 A1 | 6/2006 | Kirchhoff et al. | |
| 2007/0015535 A1* | 1/2007 | LaBauve ............. | H04L 65/1069 455/552.1 |
| 2007/0077932 A1* | 4/2007 | Pi ........................... | H04W 88/06 455/445 |
| 2008/0031228 A1 | 2/2008 | Gallant | |
| 2008/0031425 A1* | 2/2008 | Glynn ................. | H04M 1/2535 379/32.04 |
| 2008/0056208 A1 | 3/2008 | Hinrikus et al. | |
| 2008/0102844 A1 | 5/2008 | Zhu et al. | |
| 2008/0205386 A1 | 8/2008 | Purnadi et al. | |
| 2008/0222294 A1 | 8/2008 | Liang | |
| 2008/0293394 A1 | 11/2008 | Silver et al. | |
| 2009/0022103 A1 | 1/2009 | Shatsky | |
| 2009/0156209 A1* | 6/2009 | Franklin ............. | H04L 12/5692 709/227 |
| 2009/0181657 A1 | 7/2009 | Ramanathan et al. | |
| 2009/0286522 A1 | 11/2009 | Lee | |
| 2010/0035594 A1 | 2/2010 | Vendrow et al. | |
| 2010/0195641 A1 | 8/2010 | Tsai | |
| 2011/0039506 A1* | 2/2011 | Lindahl .................... | G10L 19/20 704/500 |
| 2011/0141925 A1* | 6/2011 | Velenko .................. | H04L 67/75 370/252 |
| 2011/0261792 A1 | 10/2011 | Gerton et al. | |
| 2013/0149994 A1 | 6/2013 | Gaddam et al. | |
| 2014/0029478 A1* | 1/2014 | Bhagavatula ....... | H04L 65/1096 370/259 |
| 2014/0044249 A1 | 2/2014 | Brittain | |
| 2014/0063175 A1 | 3/2014 | Jafry et al. | |
| 2014/0155085 A1 | 6/2014 | Kosseifi et al. | |
| 2014/0286200 A1 | 9/2014 | Karanam et al. | |
| 2015/0079999 A1 | 3/2015 | Toker | |
| 2015/0142702 A1* | 5/2015 | Nilsson ............... | H04M 3/2227 706/14 |
| 2015/0304500 A1 | 10/2015 | Ricci | |
| 2015/0373173 A1 | 12/2015 | Taher | |
| 2016/0014591 A1* | 1/2016 | Sekaran ............... | H04M 7/0075 455/411 |
| 2016/0072955 A1* | 3/2016 | Barkan ................. | H04M 3/543 455/417 |
| 2017/0230500 A1* | 8/2017 | Serna Pozuelo .... | H04L 65/1069 |

OTHER PUBLICATIONS

Internet LineJACK, Quicknet Technologies, Inc., www.quicknet.net/products/ilj (May 28, 2003), 2 pgs.

* cited by examiner

DYNAMIC DIRECTION OF INCOMING CALLS

OVERVIEW

The instant disclosure relates generally to communication systems and, more particularly, to telephone services as used in the communications industry. The communications industry continues to rely upon advances in technology to realize higher-functioning systems at cost-effective prices. Telephony signals can now be transmitted by methods and systems including traditional public standard telephone networks (PSTNs), Internet telephony service providers (ITSP), packet-based systems, digital wireless systems, analog wireless systems, private branch exchanges (PBX), cable systems, T1 systems, integrated service digital networks (ISDN), and digital subscriber line (DSL) systems, to name a few.

SUMMARY

Various example embodiments are directed to issues such as those addressed above and/or others which may become apparent from the following disclosure concerning routing of incoming calls to a communication device. In certain example embodiments, an apparatuses is configured user-controlled routing of incoming calls to a communication device. In an example embodiment, a call alert message, indicative of the call answer options, is communicated from the VoIP server to the communication device in response to receiving an incoming VoIP call for the communication device. A selected option is received by the VoIP server from the communication device. In response to the selected option indicating the first call answer option, the call is routed to the communication device as a VoIP call via a data network. In response to the selected option indicating the second call answer option, the call is routed to the communication device via a public switched telephone network (PSTN).

In another example embodiment, an apparatus includes a VoIP having an interface circuit and a processing circuit. The interface circuit is configured to provide VoIP communications between a public switched telephone network (PSTN) and a plurality of communication devices on an IP network by routing VoIP calls for the plurality of communication devices and communicating data for the VoIP calls between the public switched telephone network (PSTN) and the plurality of communication devices on an IP network. Each of the plurality of communication devices is assigned a respective one of a plurality of telephone extensions. The processing circuit is configured to provide user-selected routing of VoIP calls. The user-selected routing is provided by communicating a call alert message, indicative of the plurality of call answer options, to the communication device to the VoIP server receiving an incoming VoIP call for a communication device of a user. The user-selected routing is further provided by receiving a selected option from the communication device. The user-selected routing is further provided by causing the interface circuit to route the call to the communication device as a VoIP call via a data network in response to the selected option indicating the first call answer option. The user-selected routing is further provided by the VoIP server by causing the interface circuit to route the call to the communication device via a PSTN in response to the selected option indicating the second call answer option.

BRIEF DESCRIPTION OF THE FIGURES

The disclosure may be more completely understood in consideration of the following detailed description of various embodiments of the disclosure, in connection with the accompanying drawings in which.

Figure 1:
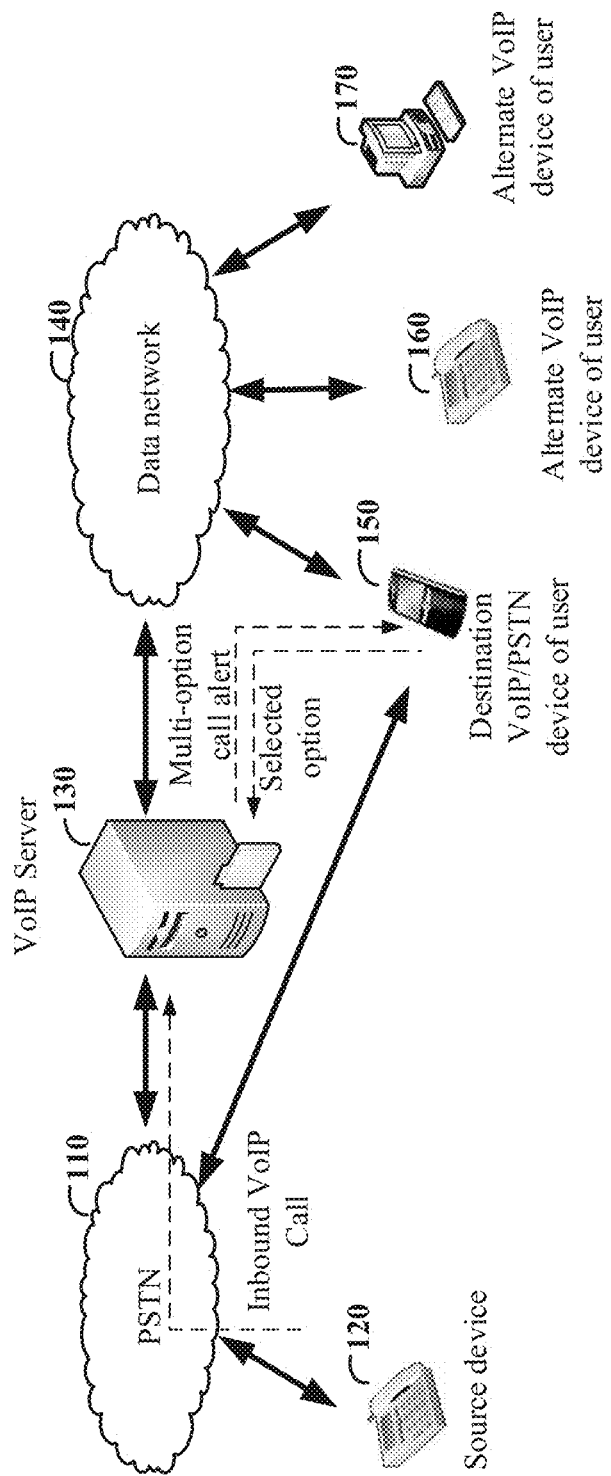
FIG. 1 shows a communication network, configured in accordance with one or more embodiments.

While various embodiments are amenable to various modifications and alternative forms, specifics thereof have been shown by way of example in the drawings and will be described in detail. It should be understood, however, that the intention is not to limit the disclosure to the particular examples and embodiments described. On the contrary, the intention is to cover all modifications, equivalents, and alternatives falling within the spirit and scope of the disclosure.

DETAILED DESCRIPTION

Aspects of the present disclosure are believed to be applicable to a variety of different types of apparatuses, including systems and/or devices, and methods involving communication services. Some example implementations are directed to circuits, apparatuses, and methods for routing of phone calls in a private branch exchange (PBX). A PBX routes calls between a service provider network (e.g., a cellular network or a public standard telephone network (PSTN)) and a plurality of telephone extensions. One type of PBX, known as an IP PBX (IPBX), routes calls between a service provider network and a plurality of communication devices on an IP network using voice-over-IP (VoIP), in which each communication is assigned a respective telephone extension. While the disclosed embodiments are not necessarily limited to such applications, various aspects of the present disclosure may be appreciated through the following discussion of various examples using this context.

Methods and apparatuses are disclosed for user-controlled routing of incoming calls to a communication device. Depending on connectivity and monthly call/data usage to date, a user may prefer to receive incoming calls as either PSTN calls or as VoIP calls. The ability to receive calls are either VoIP or non-VoIP calls is beneficial because connectivity of PSTN cellular networks and WiFi networks may vary from location to location. Moreover, monetary cost of VoIP and non-VoIP calls may vary depending on location of the source device, location of the destination number, calling/subscription plan for PSTN and/or VoIP networks, and/or or time of the month. For example, a PSTN subscription plan may specify a maximum number of call minutes or amount of data to be used in a month. Call or data usage beyond the specified maximum may be very expensive. However, it is difficult for a user receiving a call to control how a call is received. Typically, a communication device (e.g., a smartphone) having VoIP and PSTN calling capabilities is assigned a first telephone number for receiving non-VoIP calls via the PSTN and a second telephone number for receiving VoIP calls via a VoIP server. Whether a call is received as a VoIP call or a standard non-VoIP call is generally determined by which of the two numbers is dialed by a caller.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure can be combined with features of another figure even though the combination is not explicitly shown or explicitly described as a combination.

In an example embodiment, a call alert message, indicative of the call answer options, is communicated from the VoIP server to the communication device in response to receiving an incoming VoIP call for the communication device. For ease of reference, the call alert message may be referred to as a multi-option call alert. The multi-option call alert prompts the communication device to provide a call interface for a user to select from a plurality of options for answering the call. Some various options may include, for example, hang-up, answer as VoIP voice call, answer as PSTN voice call, answer as video conference, and/or redirect to other devices (e.g., devices in close proximity or specified in a list of devices). In various implementations, the options for answering an incoming call may be determined by the communication device, by the VoIP server, or a combination thereof. Additionally or alternatively, a communication device may be configured to allow a user to adjust communication settings for a connection dynamically during a call. For example, the call interface can include secondary (e.g., drop down) options that allow for selection of one or more options for a call answer selection. For instance, a VoIP call selection option could include different audio bit rates, different audio formats, or one or more options for encrypting communications.

In some implementations, the call interface may display various additional information that may be relevant to the selection between the available options. Additional information may include, for example, recorded data and/or voice usage on the device for the billing cycle, data and/or voice limits allocated by a PSTN for the current billing cycle, geographic location, identify of caller, signal strength of available connections, and/or predicted call quality of available connections. For instance, a smart phone device might be connected to a WiFi network, which preferentially used for data over a cellular data connection. Upon receipt of an incoming call, options that use a data/VoIP connection to the smart phone device can also include information about the quality of the WiFi connection, such as the signal strength, connection bandwidth, and latency to the VoIP server. The same smart phone device could also be preferentially using a cellular data connection that incurs data charges based upon the amount of data used (e.g., through overages relative to a monthly limit, or a cost per data amount). For this situation and when an incoming call is received, options that use a data/VoIP connection can display current data usage as well as information such as an expected call quality (e.g., determined from latency and other parameters that can be measured and tracked by the VoIP server and smart phone device).

The communication device communicates an answer command indicating a selected option to the VoIP server. In response to the answer command indicating the first call answer option, the call is routed to the communication device as a VoIP call via a data network. In response to the answer command indicating the second call answer option, the call is routed to the communication device via a PSTN.

In some implementations, configuration settings stored on a communication device and/or a VoIP server may be configured to adjust options/information, that are displayed to a user in a call interface GUI on a device, based on set of criteria indicated in the configuration settings. For example, options and/or information to be displayed may be adjusted based on: time and/or date, recorded data and/or voice usage on the device, data and/or voice limits allocated by a PSTN for the current billing cycle, geographic location, identify of caller, signal strength of available connections, and/or predicted call quality of available connections, nearby devices, battery life, and/or display capabilities of the device.

In some implementations, configuration settings stored on a communication device and/or a VoIP server may be configured to automatically select an option for answering a call in response to a set of criteria in the configuration settings being satisfied. As an illustrative example, configuration settings may be set to automatically select to receiving an incoming call as a VoIP call in response to call usage for a current month exceeding an allocation of call minute provided in a PSTN subscription for the device. Criteria for automated selection call options for answering an incoming call may include, for example, monthly usage of minutes/data, connectivity of PSTN and/or data networks, geographic location, and/or priorities listed for particular numbers and/or communication devices in the configuration settings.

Options may be dynamically determined, for example, by an option selection executing on the communication device and/or on a VoIP server. The selection algorithm may be specified, for example, in a configuration settings file stored on the device or on the VoIP server. As an illustrative example, the selection algorithm may be configured to preferentially provide at least one VoIP option and one PSTN option for answering an incoming call. If recorded data usage over a cellular PSTN network is over a user-specified data threshold, the selection algorithm can adjust the options to remove options that use cellular data (e.g., VoIP options) if a WiFi data connection is not available. Conversely, if recorded VoIP usage is over a user-specified voice threshold, the selection algorithm can adjust the options to remove options that use a PSTN voice connection directly to the device. As another example, a selection algorithm can adjust options to include an option to redirect to a home phone number if a detected geographic location of the device is in a geographic regions of a user's residence. If the detected geographic location of the device is outside of the geographic regions of the user's residence, the selection algorithm may remove the option to redirect to the home phone number.

In some embodiments, the device and/or VoIP server may be provide a graphical user interface (GUI), e.g., a webpage interface, including a mechanism for the user of the device to select/adjust options to be displayed for answering incoming calls and/or to define/adjust criteria used by a selection algorithm for dynamic selection of option that are to be displayed when an incoming call is received. In some implementations, the selection algorithm may be implemented using a machine learning algorithm (e.g., an evolutionary algorithm). The machine learning algorithm may be evaluated and adjusted in a training process to improve performance and/or accuracy of algorithm. Training may include supervised learning, which manually assesses performance or selects modifications, or may include unsupervised learning, which automatically assesses performance of different variations of the algorithm (e.g., based on user selection of options when incoming calls are received. For example, a selection algorithm may be adjusted to cause an additional option to be included in a set of optioned to be displayed on a trial basis. If the added option is selected by the user during the trial basis the adjusted selection algorithm may replace the current selection algorithm. If the added option is not selected by the user, the adjusted algorithm may be discarded.

In some embodiments, a communication device may be configured to allow a user to change the selection of the option for connecting to an ongoing call. For example, if a current connection for a call is poor quality, a user may wish to switch from a PSTN connection to a VoIP connection or visa-versa. Similarly, a user may initially answer a call as a Voice call and later switch to a Video call, or visa-versa. In response to receiving a new selection from the communication device, the VoIP server may initiate a new connection for routing the call with the desired settings. When the new connection is received at the communication device, the communication device may seamlessly switch to the new connection without interruption of service. Additionally or alternatively, in some implementations, options may be updated during a call as options become available or unavailable. In some implementations, a communication device may additionally or alternatively be configured to allow a user to adjust communication settings for a connection (e.g., bitrate, audio format, and/or encryption options) dynamically during a call.

For ease of explanation, the examples are primarily described with reference to a mobile device (e.g., a smartphone). However, the embodiments are not so limited. For instance, a networked IP phone may be configured to provide options to answer an incoming call as a VoIP call to the IP phone or another device detected to be in close proximity (e.g., a mobile device or video conferencing application).

Turning now to the figures, FIG. 1 shows a communication network, configured in accordance with one or more embodiments. The communication network includes a VoIP server 130, configured to route calls for a plurality of communication devices 150, 160, and 170 of a user connected to a data network 140. The VoIP server is configured to route VoIP calls between devices (e.g., 120) connected in a PSTN 110 and the plurality of communication devices 150, 160, and 170.

When an incoming call to a VoIP number of one of the communication devices 150 is received, the VoIP server 130 is configured to provide a multi-option call alert to the communication device 150. The multi-option call alert may be provided as a data packet communicated to the communication device via data network 140 or another data network (e.g., a cellular and/or WiFi data network). Different embodiments may communicate the multi-option call alert using various messages/signals including, for example, a modified session initiation protocol (SIP) INVITE command message or an SIP INFO command message. The multi-option call alert prompts the communication device 150 to provide a call interface for a user to select from a plurality of options for answering the call. As previously described, the options may include for example, hang-up, answer as VoIP voice call, answer as PSTN voice call, and/or answer as video conference. Additionally or alternatively, the options may include an option to redirect the call to another device (e.g., 160 or 170) that are determined to be in close proximity of the communication device 150 or specified in a list of devices registered to the user.

Devices in close proximity may be determined by the device 150 and/or VoIP server 150, for example, by sensing the device (e.g., RF transmissions of the devices or based on detected/reported geographic location of the devices 150, 160, and/or 170). As one example, an application running on the communication device may determine a geographic location of the device using GPS. Alternatively or additionally, geographic location may be determined based on network connections or other devices detected on the same network. For instance, the communication device may be connected to a local area network (LAN), such as a network at an individual's home residence or work, can search for other VoIP capable devices on the same local area network (LAN). For instance, each device could have a VoIP capable application that includes the added function of providing status notifications to other devices running a similar application on the same network. In this manner, when a user enters their home they could receive options for redirecting incoming calls to a home telephone number or to their home computer, laptop, tablet, or other devices that are connected to their home LAN. When the same individual goes to work and connects to their work LAN, they could be provide with options for redirecting incoming calls to a work telephone number or to various devices of the user that are connected in the work LAN. As another example, the application may be configured to utilize a Bluetooth interface on the communication device to detect when other devices of the user having specified Bluetooth identifiers are in range. In some embodiments, the connection options can be provided based upon available networks irrespective of the detection of other devices on the networks. For example, a first list of options could be presented when the smart phone device determines that it is within range of a user's home WiFi network, while a second list of options could be presented when a the device is within range of a user's work WiFi network. This allows for customized lists without explicit connections between the smart phone device and the specific devices corresponding to the options.

Alternatively or additionally, a list of devices registered to the user, may be stored, for example, locally on the communication device 150 or by the VoIP server 150. The communication device 150 communicates an answer command indicating a selected option to the VoIP server 130. The answer command may be communicated to the server using various messages/signals including, for example, a modified session initiation protocol (SIP) INVITE command message or an SIP INFO command message. As another example, the communication device may establish a separate communication link with the VoIP server to communicate the selected option. For example, a TCP or UDP connection could be established and then used to communicate the call answer options and corresponding selections. Different embodiment may communicate the multi-option call alert using various messages/signals including, for example, a modified SIP 200 OK command message or an SIP INFO command message. In response to the answer command indicating the VoIP option, the VoIP server 130 routes the call to the communication device as a VoIP call via the data network 140. In response to the answer command indicating a PSTN answer option, the VoIP server 130 routes the call to the communication device 150 via the PSTN 110.

Figure 2:
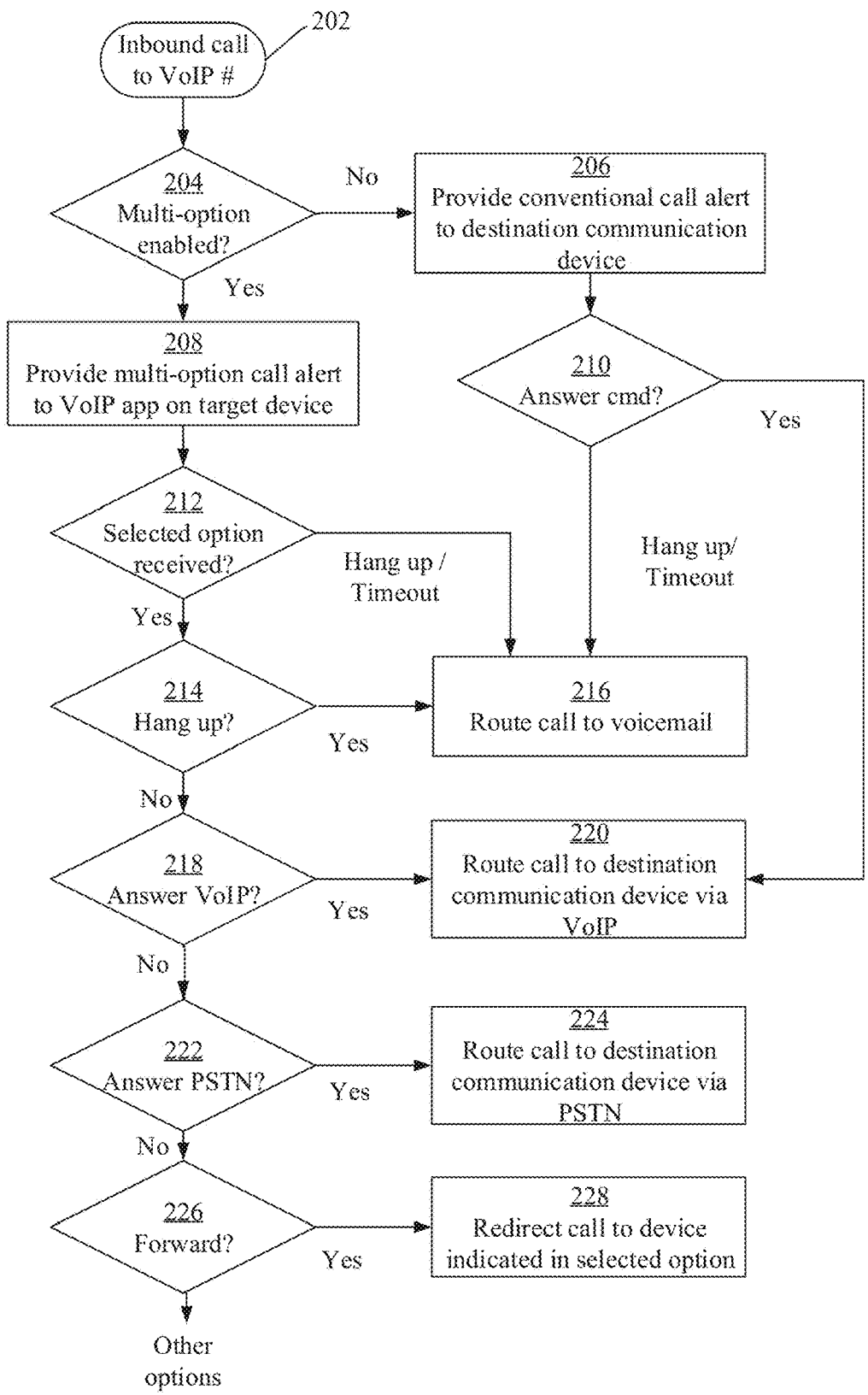
FIG. 2 shows an example process for operating a VoIP server, in accordance with one or more embodiments.

FIG. 2 shows an example process performed at a VoIP server (e.g., 130), in accordance with one or more embodiments. The process is initiated when an inbound call to a VoIP number 202 is received by a VoIP server. At decision block 204, the VoIP server determines whether or not a multi-option call alert will be provided. If a multi-option call alert is enabled, the VoIP server provides a multi-option call alert, at block 208, to a communication device (e.g., 150) that is assigned the VoIP number. As described in more detail with reference to FIG. 3, the multi-option call alert prompts a VoIP application to display a GUI interface having multiple answer options. In some implementations, one or more options may be specified in the multi-option call alert. Additionally or alternatively, one or more of the options may be determined by the VoIP device (e.g., in a list of options). Upon selection of one of the options, the communication device communicates the selected option to the VoIP server.

If a caller hangs up or a threshold number of rings is reached before an option selection is received, at decision block 212, the VoIP server route the call to voicemail provided for the VoIP number at block 216. In some implementations, the VoIP server may be configured to route the call to a voicemail account provided for by a PSTN provider or third party (e.g., Google Voice). The threshold number of rings may be specified, for example, by configuration settings for the VoIP number. The configuration settings may be stored, for example, in a database accessible by the VoIP server. If a threshold number of rings is not specified for the VoIP number, a default number of rings (e.g., 4 rings) may be used as threshold number. For ease of reference, reaching the threshold number of rings may be referred to as timeout.

If a selected option is received, at decision block 212, prior to timeout or the caller hanging up, the process performed by the VoIP server proceeds to decision block 214. At decision block 214, if the selected option is a hang-up command, the VoIP server routes the call to voicemail at block 216. Otherwise, at decision block 218, if the selected option is to answer with VoIP, the VoIP server routes the call to the destination communication device via VoIP at block 220. Otherwise, at decision block 222, if the selected option is to answer with PSTN, the VoIP server routes the call to the destination communication device via a PSTN at block 224. In some embodiments, a VoIP server may route the incoming call to the destination device via a PSTN by redirecting the call to a PSTN number assigned to the destination device. The PSTN number may be provided to the VoIP server along with the selected option. Alternatively, a PSTN number assigned to a communication device may be stored in a database accessible by the VoIP server. In some other embodiments, the destination device may be configured to place a PSTN call to a PSTN number of the VoIP server if the PSTN option is selected. The VoIP server will route the call to the destination communication device by merging the PSTN call from the destination communication device with the incoming call.

In this example, a user may also select to redirect the call to another communication device (e.g., a device in local proximity or included in a list of devices registered to a user). Other communication devices (e.g., 160 and 170) available for receiving an incoming call, may be determined by the VoIP server and/or by the communication device. At decision block 226, if the selected option is to redirect the call to another device, the VoIP server redirects the call to a telephone number for a device indicated by the selected option at block 228. The telephone number may be provided to the VoIP server along with the selected option, for example, or may be specified in a databased accessible by the VoIP server. In some embodiments, various other options may be presented to and selected by a user (e.g., call with video, conferencing call with multiple other users, or redirect call to a number specified by the user).

If multi-option call alert is not enabled when the inbound call is received decision block 204, the VoIP server provides a conventional call alert is provided to the destination communication device. The call alert prompts the VoIP device to provide an indication of an incoming call (e.g., ring, vibrate, and/or caller-ID). At decision block 210, if a command to answer is received from the destination communication device, the VoIP server completes a VoIP connection to the destination communication device. Otherwise, at decision block 210, if the caller hangs up or timeout occurs, the VoIP server directs the process to route the call to voicemail at block 216.

Figure 3:
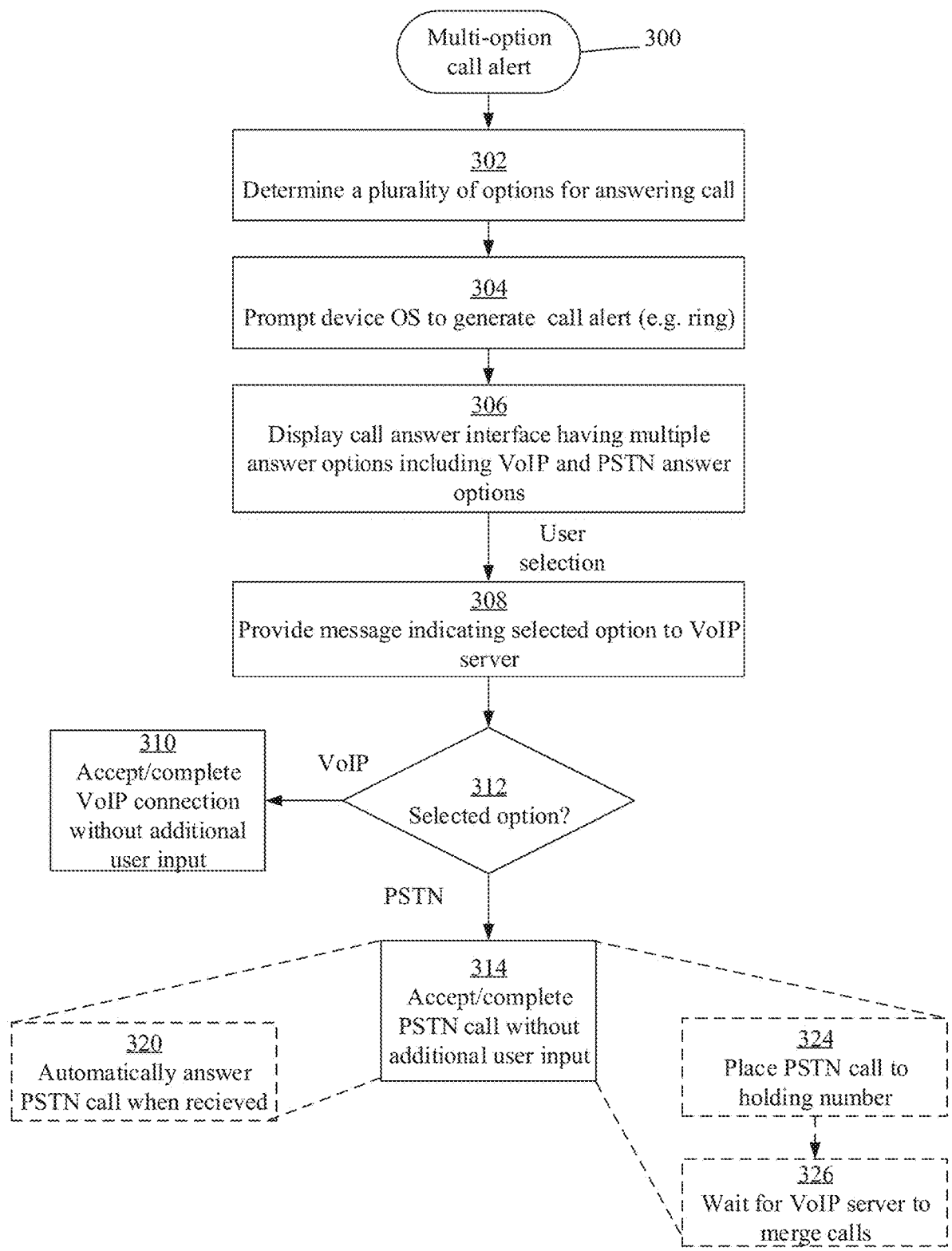
FIG. 3 shows an example process for operating a communication device, in accordance with one or more embodiments.

FIG. 3 shows an example process for operating a communication device (e.g., 150), in accordance with one or more embodiments. The process may be performed, for example, by an application executing on the communication device. In response to receiving a multi-option call alert 300 from a VoIP server (e.g., 130), the application determines a plurality of options for answering the call at block 302. At block 304, the application prompts the VoIP device to generate a call alert (e.g., ring and/or vibrate). At block 304 the application displays a call answer interface having multiple answer options. As previously discussed, answer options may include for example, hang-up, answer as VoIP voice call, answer as PSTN voice call, answer as video conference, and/or redirect to another communication device (e.g., detected in proximity or specified in a list of user devices). The plurality of answer options may be specified, for example in the received multi-option call alert 300 and/or in a list of options stored on the VoIP device. For ease of explanation, this example is described with reference to a set of answer options including an option to answer a call via VoIP or answer the call via PSTN. In response to a user selection of an option, the application communicates a message indicating the selected option to the VoIP server at block 308

At decision block 312, if the selected option is to answer the call via VoIP, the application provides necessary control signals (e.g., SIP 200 OK) to the VoIP server to accept/complete a VoIP connection for the call at block 310 without additional user input. At decision block 312, if the user selects to answer the call via a PSTN, the application accepts/completes a PSTN connection for the call at block 314 without additional using input. In some implementations, the connection may be accepted/completed by automatically answering the call at block 320 after it if redirected by the VoIP server to the PSTN number of the destination communication device. Alternatively, in some implementations, the PSTN connection may be completed by placing a PSTN call at block 324 to a holding number of the VoIP device and waiting at block 326 for the VoIP server to merge the PSTN call with the incoming call. In this example, selecting of either PSTN of VoIP options automatically accepts/completes a connection for the call without additional user input. From the perspective of the user, the selection of the VoIP option appears to answer the call.

In the processes shown in FIGS. 2 and 3, the VoIP server routes a call according to the user selected answer option. This mechanism works well for directing calls to a VoIP number, which are received and routed by a VoIP device. However, conventional calls to a PSTN number of a communication device are not received or controlled by a VoIP server. In some embodiments, calls to a PSTN number of a communication device are automatically redirected to a VoIP number of the communication device after a threshold number of rings or a Decline command is communicated to the PSTN. Such automated redirection may be achieved using, for example, using Delayed Call Forwarding services provide by many PSTN operators. Delayed Call Forwarding from a PSTN number of a device to a VoIP number of the device may be setup automatically or manually when a VoIP application is installed on the device. The redirected call to the VoIP number will be received by the VoIP server and, therefore, can route the call according to a user selected answer option as described with reference to FIGS. 2 and 3.

Figure 4:
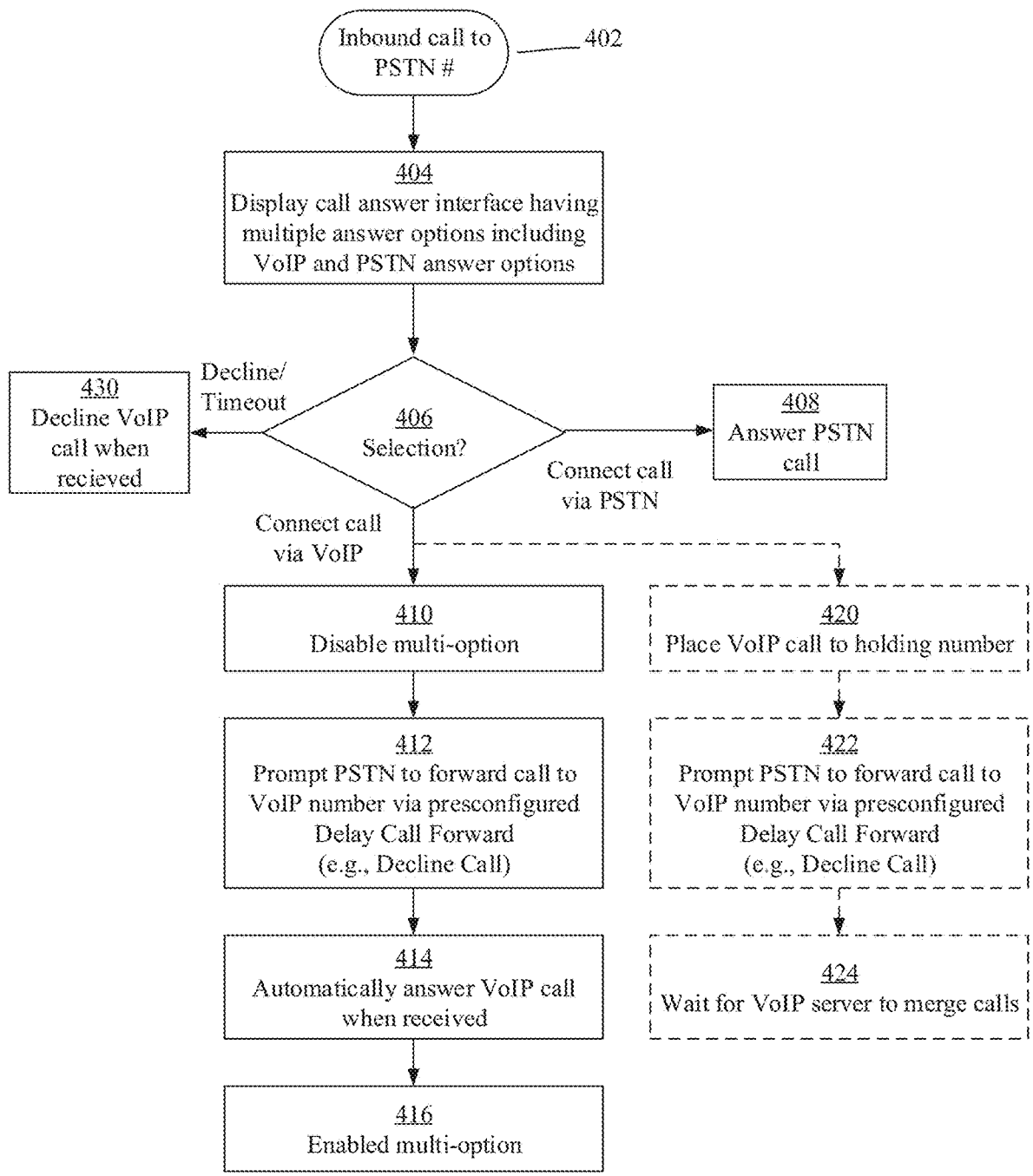
FIG. 4 shows an example process for operating a communication device, in accordance with one or more embodiments.

FIG. 4 shows another example process for operating a communication device, in accordance with one or more embodiments. In this example, an application on a communication device (e.g., a smartphone) provides a user with multiple call answer options when an incoming call to a PSTN number 402 is received by the communication device. At block 404, the application displays a call answer interface having multiple answer options, for example, as described with reference to FIG. 3. For ease of explanation, this example is described with reference to a set of answer options including an option to answer a call via VoIP and an option to answer the call via PSTN.

At decision block 406, different actions are initiated based on the option selected by a user. If a user selects the option is to answer the call via PSTN, the application answers the PSTN call at block 408 in the conventional manner. If the user selects to answer the call via a VoIP, multi-option call alerts are disabled for the VoIP number of the device. Disabling of the multi-option call alert prevents the VoIP server and communication device from again asking the user to select an answer option when the call is redirected via VoIP. At block 412, the application prompts the PSTN, at block 410, to redirect the call to the VoIP number of the device pursuant to a preconfigured Delayed Call Forwarding. The PSTN may be prompted to redirect the call, for example, by providing a DECLINE command to the PSTN. Because multi-option call alert is disabled, the VoIP server routes the redirected call directly to the communication device using a conventional call alert. At block 414, the call to the VoIP number is automatically answered without additional input by the user. After answering the call to the VoIP number, multi-option call alters are re-enabled at block 416.

Alternatively, in some embodiments, the communication device may place a separate VoIP call to the server to be merged with the forwarded PSTN call by the VoIP server. When the option is to answer the call via VoIP, the application places a VoIP call is placed to a holding number of the VoIP server at block 420. At block 422, the application prompts the PSTN to redirect the call to the VoIP number of the device pursuant to the preconfigured Delayed Call Forwarding. At block 424, the application on the communication device waits for the VoIP server to merge the VoIP call to the holding number with the PSTN call redirected to the VoIP number. When an incoming call to the VoIP number is received, the VoIP server may be configured to check to see if a call from the VoIP number is pending at the holding number. If so, the VoIP server merges the two calls. Otherwise, the VoIP server may route the call, for example, as described with reference to FIG. 2.

If the user does not select an option before the threshold number of rings at which Delayed Call Forwarding to the VoIP number is triggered (or if a user selects to decline the call), the application device is configured automatically respond to multi-option call alert with a decline command, at block 430, without additionally user input. From the user perspective, the incoming call timed out or was declined in the conventional manner.

As an alternative to using Delayed Call Forwarding to reroute a call to a communication device over a VoIP connection, some embodiments may establish a VoIP connection using an automated callback process. As described with reference to FIG. 4, a communication device may be configured to display a multiple option call answer interface when a PSTN call is received. If the user selects a PSTN option, the call is answered in a conventional manner. If the user selects a VoIP option, the call is automatically declined and a new outgoing call is placed to the original caller via the VoIP server. The original caller of the PSTN call may be specified, for example, in caller ID information provide for the PSTN call. A connection is established when the outgoing call is answered by the original caller. This automated call back process may be useful, for example, when a PSTN provider for a communication device does not offer Delayed Call Forwarding service.

Additionally or alternatively, in some embodiments, an incoming call to a PSTN number of a communication device may be redirected to a VoIP number of the device by a source VoIP server that provides VoIP service of a caller. For example, when an outgoing call is placed from a VoIP device to a PSTN number, the source VoIP server may determine whether or not the called number is a device that supports multi-option call alerts. Devices that support multi-option call alerts may be listed in an electronic databased accessible by VoIP servers for one or more VoIP providers. The databased may specify, for example, a PSTN and VoIP number for each communication device that multi-option call alerts. If the called PSTN number is determined to correspond to a compatible device, the source VoIP server may redirect the call to a VoIP number for the communication device. A destination VoIP server providing service for the called communication device may provide a multi-option call alert to the communication device, for example, as described to FIGS. 1-3. Alternatively or additionally, the source VoIP server may provide a multi-option call alert to the called communication device. The source VoIP server may then route the call via PSTN or VoIP according to the option selected by the user.

Figure 5:
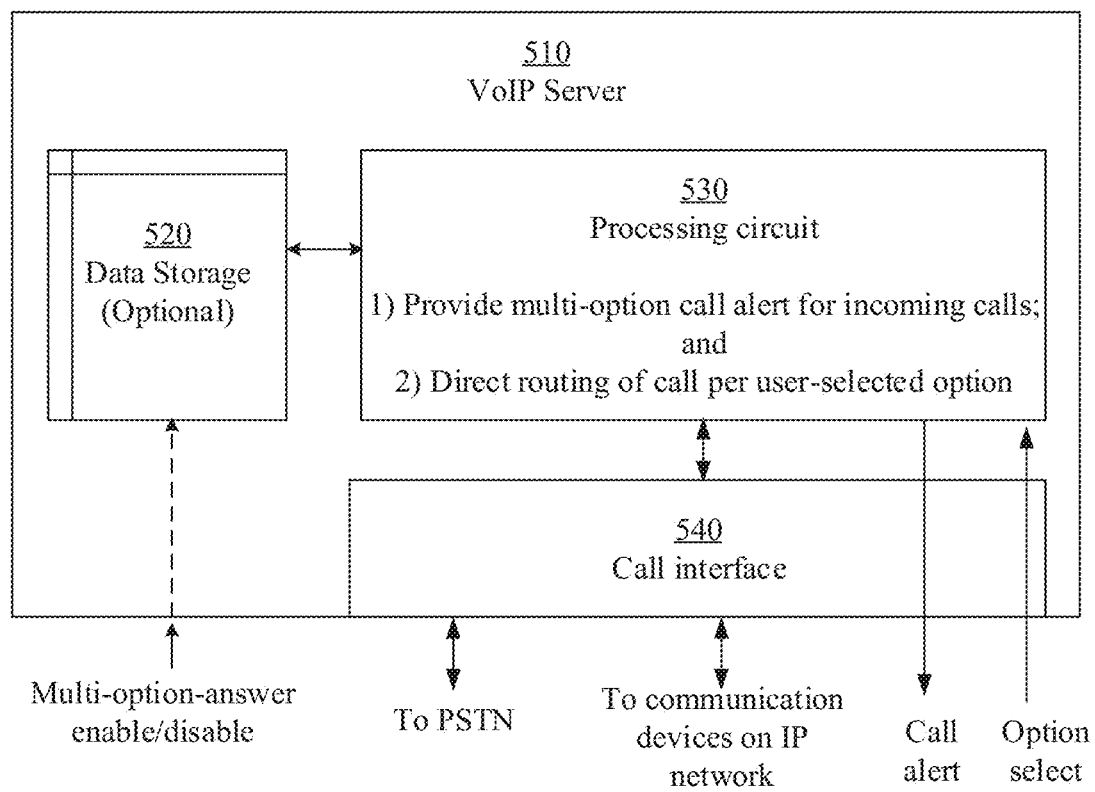
FIG. 5 shows a VoIP server, configured in accordance with one or more embodiments.

FIG. 5 shows a VoIP server, configured in accordance with one or more embodiments. The VoIP server 510 includes an interface circuit 540, configured to route calls between a PSTN and a plurality of communication devices on an IP network. As an illustrative example, each of the plurality of communication devices may corresponds to a respective telephone extension in an IPBX. The VoIP server 510 also includes a processing circuit 530. The processing circuit 530 may be direct the call interface circuit 540 to route incoming calls based on user selected options as described with reference to FIG. 2-4.

In this example, when multi-option call alerts are enabled, the processing circuit 530 is configured to determine a plurality of call answer options in response to the VoIP server receiving an incoming call for a VoIP number of a communication device. Call options may be specified in a set of configuration settings for the VoIP number stored, for example, in a data storage circuit 520. Configuration settings for a particular VoIP number may also specified, for example, whether or not multi-option call alerts are enabled for the VoIP number. Additionally or alternatively, configuration settings may be stored on an external storage circuit communicatively coupled to the VoIP server 510. The processing circuit is further configured to provide a multi-option call alert message, indicative of the plurality of call answer options, to the communication device. As previously described, in some embodiments, call answer options may additionally or alternatively be determined at the communication device in response to receiving a multi-option call alert. In such implementations, the multi-option call alert may not necessarily specify any call options.

The processing circuit 530 is configured to receive an answer command from the communication device indicating a selected call option. If the selected option is to answer with VoIP, the processing circuit 530 directs the call interface circuit 540 to route the call to the destination communication device as a VoIP call. Otherwise, if the selected option is to answer with PSTN, the processing circuit 530 directs the call interface circuit 540 to route the call to the destination communication device to a PSTN number assigned to the destination communication device. As previously described, the PSTN number may be specified for example, in the answer command that specifies the selected call option. Alternatively, the PSTN number may be specified in the set of configuration settings for the VoIP number.

Some embodiments may utilize various other methods for directing calls in addition to or in lieu of the examples discussed with reference to FIGS. 1-5. For example, in some implementations, a VoIP server may be configured to simultaneously route an incoming call to a communication device via a VoIP connection as well as a PSTN connection. The communication device may provide a call answer interface having options for answering the incoming call via either the VoIP or PSTN connections. The communication device may be configured to accept/complete the connection selected by a user and hang up on the non-selected connection.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., a call control circuit). Similarly, the term "device" is used herein to refer to a circuit designed, configured and arranged as electronic equipment for a particular purpose circuit (e.g., communication device refers to circuit-based communications equipment such as a smartphone for providing a user of the device the ability to communicate). As further examples of such terminology and teaching in the instant disclosure, in certain of the above-discussed embodiments, one or more modules are discrete logic circuits or programmable logic circuits configured and arranged for implementing these operations/activities, as in the blocks shown in FIGS. 1-5. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, in which the first module includes a first CPU hardware circuit with one set of instructions and the second module includes a second CPU hardware circuit with another set of instructions. Certain embodiments are directed to a computer program product (e.g., nonvolatile memory device), which includes a machine or computer-readable medium having stored thereon, instructions which may be executed by a computer (or other electronic device) to perform these operations/activities.

Certain embodiments are directed to a computer program product (e.g., nonvolatile memory device), which includes a machine or computer-readable medium having stored thereon, instructions which may be executed by a computer (or other electronic device) to perform these operations/activities. For example, these instructions reflect activities or data flows as may be exemplified in the flow chart. As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one embodiment/figure can be combined with features of another even though the combination is not explicitly shown or explicitly described as a combination. Such modifications do not depart from the true spirit and scope of various aspects of the disclosure, including aspects set forth in the claims.

What is claimed is:

1. A method for use with a data-communications server communicatively coupled with a data communications system including an IP network, a public switched telephone network (PSTN) and communication devices operative with calls to and/or from the communication devices to be routable over the IP network and the PSTN via the data-communications server, the method comprising:

providing a call alert message, in response to the data-communications server receiving a call for a communication device of a user, to an application operable on the communication device by the data-communications server, wherein the call alert message is indicative of a plurality of call answer options being available to the user for answering an incoming call on the communication device and being determined based on a current connectivity and on predicted call quality of one or more available connections other than a connection corresponding to the current connectivity, and wherein determining the call answer options includes an ability to change the plurality of call answer options based on the current connectivity and on the predicted call quality of one or more available connections;

receiving, at the data-communications server, a selected option among the plurality of call answer options from the communication device of the user;

in response to the selected option indicating a first call answer option, routing the incoming call to the communication device as one type of call via a data network; and in response to the selected option indicating a second call answer option, routing the incoming call as a type of call different than said one type of call via the PSTN or IP network, wherein the call alert message is configured to cause the communication device to determine the plurality of call answer options based on a subscription plan that is associated with the data-communications server and that identifies allotted data in a period of time.

2. The method of claim 1, wherein the plurality of call answer options are associated with different systems for providing communications, the different systems including the data network and the PSTN, and wherein the one type of call via a data network is one of: a VoIP (voice-over-IP) call and a non-VoIP call.

3. The method of claim 1, further comprising, in response to the selected option indicating a third call answer option, forwarding the incoming call to a different communication device indicated in the selected option.

4. The method of claim 1, wherein the first call answer option and second call answer option are associated with routing of the call to the same communication device respectively using wireless connection via the data network and a cellular data connection via the PSTN.

5. The method of claim 1, wherein the determination of the call answer options occurs in response to receiving the incoming call as a VoIP type of call.

6. The method of claim 1, wherein the incoming call is a type of call other than a VoIP call, and in response to the selected option indicating a first call answer option, routing the incoming call to the communication device as a VoIP call.

7. The method of claim 1, wherein the ability to change the plurality of call answer options includes an ability to add certain of the plurality of call answer options.

8. The method of claim 1, wherein the ability to change the plurality of call answer options includes an ability to remove certain of the plurality of call answer options.

9. The method of claim 1, further comprising determining the plurality of call answer options based on the current connectivity and data usage that is indicative of both the PSTN and VoIP usage in the period of time, the plurality of call answer options including the first and second call answer options.

10. The method of claim 1, wherein the plurality of call answer options include two or more of: hang-up, routing to the communication device via the PSTN, routing to the communication device as a VoIP call via the data network, and routing to the communication device as a video-conference.

11. The method of claim 1, wherein the method includes the data-communications server determining the call answer options and communicating the call alert message to the communication device in response to receiving an incoming VoIP call for the communication device.

12. The method of claim 1, wherein the determining of the plurality of call answer options is further based on a geographic location of the communication device.

13. The method of claim 1, further including identifying one or more of the communication devices in a geographic location of the communication device, and determining a third call answer option based on the geographic location.

14. The method of claim 1, wherein the subscription plan includes identification of allotted data in the period of time and a data charge for data usage greater than the allotted data.

15. The method of claim 1, wherein providing the call alert message includes providing identification of at least one of: the current connectivity; data usage indicative of VoIP usage in a period of time; data usage indicative of PSTN usage in a period of time; and data usage indicative of VoIP and PSTN usage in a period of time.

16. The method of claim 1, further comprising:
in response to the communication device being located at a home location, identifying a home telephone number of a user of the communication device as one of the plurality of call answer options; and
in response to the communication device being located at a work location, identifying a work telephone number of the user as one of the plurality of call answer options.

17. The method of claim 1, further comprising, using the data-communications server and the communication device:
providing a graphical user interface (GUI) to the user, with the GUI providing the user the plurality of call answer options in response to receiving the call alert message;
providing secondary options to the user via the GUI in response to selection of the first call answer option, the secondary options including data selected from the group consisting of: audio bit rates, audio formats, encryption options, and combination thereof.

18. The method of claim 1, further comprising causing a PSTN operator to forward incoming calls to a PSTN number associated with the communication device to a VoIP number for the communication device via call forwarding.

19. The method of claim 1, wherein the communication device includes a graphical user interface (GUI) communicatively coupled to the data-communications server, and the method further includes: prompting the user, via the GUI and in response to the incoming call, via the plurality of call answer options to select the first call answer option via the GUI, or to direct that a PSTN operator redirect the incoming call to a VoIP number by declining the incoming call.

20. A data-communications server communicatively coupled to a data-communications system including an IP network, a public switched telephone network (PSTN), and communication devices operative with calls to and/or from the communication devices to be routable over the IP network and the PSTN via the data-communications server, the data-communications server comprising:
a communications interface, including circuitry integrated with the data-communications server, to provide a call alert message, in response to the data-communications server receiving a call for a communication device of a user, to an application operable on the communication device by the data-communications server, wherein the call alert message is indicative of a plurality of call answer options being available to the user for answering an incoming call on the communication device and being determined based on a current connectivity and on predicted call quality of one or more available connections other than a connection corresponding to the current connectivity, and wherein determining the call answer options includes an ability to change the plurality of call answer options based on the current connectivity and on the predicted call quality of one or more available connections; and
communications circuitry to:
receive a selected option among the plurality of call answer options from the communication device of the user;
route the incoming call, in response to the selected option indicating a first call answer option, to the communication device as one type of call via a data network; and
route the incoming call, in response to the selected option indicating a second call answer option, as a type of call different than said one type of call via the PSTN or IP network, wherein the call alert message is configured to cause the communication device to determine the plurality of call answer options based on a subscription plan that is associated with the data-communications server and that identifies allotted data in a period of time.

21. A method for use with a data-communications server communicatively coupled with a data communications system and communication devices operative with calls to and/or from the communication devices to be routable via the data-communications server, the method comprising:

providing a call alert message, in response to the data-communications server receiving a call for a communication device of a user, to an application operable on the communication device by the data-communications server, wherein the call alert message is indicative of a plurality of call answer options being available to the user for answering an incoming call on the communication device and being determined based on a current connectivity and on predicted call quality of one or more available connections other than a connection corresponding to the current connectivity, and wherein determining the call answer options includes an ability to change the plurality of call answer options based on the current connectivity and on the predicted call quality of one or more available connections;

receiving, at the data-communications server, a selected option among the plurality of call answer options from the communication device of the user;

in response to the selected option indicating a first call answer option, routing the incoming call to the communication device, as one type of call via a data network, and establishing a new connection for the incoming call based on the one or more available connections; and in response to the selected option indicating a second call answer option, routing the incoming call as a type of call different than said one type of call.

\* \* \* \* \*